United States Patent
Vu et al.

(10) Patent No.: US 10,962,684 B2
(45) Date of Patent: Mar. 30, 2021

(54) CAST LENS

(71) Applicant: Vision Ease, LP, Ramsey, MN (US)

(72) Inventors: Hannah Vu, New Brighton, MN (US); David Olund, Stanchfield, MN (US); Sarawuth Seewattanangkoon, Chiang Mai (TH); Ladawan Chantharadet, Pathum Thani Province (TH); Harjit Bhambra, Anok, MN (US); Tim Reynolds, Roseville, MN (US); Robin Kezar, Coon Rapids, MN (US); Jeff Brown, St. Louis Park, MN (US); Richard Blacker, Lino Lakes, MN (US)

(73) Assignee: Vision Ease, LP, Ramsey, MN (US)

( * ) Notice: Subject to any disclaimer, the term of this patent is extended or adjusted under 35 U.S.C. 154(b) by 395 days.

(21) Appl. No.: 15/593,148

(22) Filed: May 11, 2017

(65) Prior Publication Data

US 2017/0329051 A1 Nov. 16, 2017

Related U.S. Application Data

(60) Provisional application No. 62/336,368, filed on May 13, 2016.

(51) Int. Cl.
*G02B 1/04* (2006.01)
*G02B 1/14* (2015.01)
(Continued)

(52) U.S. Cl.
CPC .......... *G02B 1/041* (2013.01); *B29D 11/0048* (2013.01); *B29D 11/00528* (2013.01);
(Continued)

(58) Field of Classification Search
CPC .... G02B 1/041; G02B 1/14; B29D 11/00528; B29D 11/00923; B29D 11/0048; B29D 11/00865; B29D 11/00653; B29D 11/00442; B29K 2075/00; B29K 2069/00; G02C 2202/16; G02C 7/102; G02C 7/12
(Continued)

(56) References Cited

U.S. PATENT DOCUMENTS 6,177,032 B1 * 1/2001 Smith ................ B29D 11/0073
264/1.32
7,884,992 B1 * 2/2011 Wang ...................... G02B 5/23
349/13
(Continued)

FOREIGN PATENT DOCUMENTS

| EP | 2799514 A1 | 5/2014 |
|---|---|---|
| JP | H063504 A | 1/1994 |

(Continued)

OTHER PUBLICATIONS

JPH1130715A, Hiroyuki et al., Nippon Sythetic Chem Ind., 1999; English translation. (Year: 1999).*

(Continued)

*Primary Examiner* — Marin Pichler
*Assistant Examiner* — Alberto J Betancourt
(74) *Attorney, Agent, or Firm* — Inskeep IP Group, Inc.

(57) ABSTRACT

An ophthalmic lens incorporating an optically functional wafer having improved adhesion to a polymerized polyurea-urethane bulk lens resin.

14 Claims, 6 Drawing Sheets

(51) Int. Cl.
*G02C 7/10* (2006.01)
*G02C 7/12* (2006.01)
*B29D 11/00* (2006.01)
*B29K 69/00* (2006.01)
*B29K 75/00* (2006.01)

(52) U.S. Cl.
CPC .. *B29D 11/00865* (2013.01); *B29D 11/00923* (2013.01); *G02B 1/14* (2015.01); *B29D 11/00442* (2013.01); *B29D 11/00653* (2013.01); *B29K 2069/00* (2013.01); *B29K 2075/00* (2013.01); *G02C 7/102* (2013.01); *G02C 7/12* (2013.01); *G02C 2202/16* (2013.01)

(58) Field of Classification Search
USPC ............ 351/159.01, 159.61, 159.42, 159.49; 359/642, 487.02, 487.05
See application file for complete search history.

(56) References Cited

U.S. PATENT DOCUMENTS

| | | |
|---|---|---|
| 2003/0042633 A1 | 3/2003 | Foreman et al. |
| 2004/0017610 A1* | 1/2004 | Evans ..................... G02C 7/12 359/487.02 |
| 2004/0125337 A1 | 7/2004 | Boulineau et al. |
| 2004/0167311 A1* | 8/2004 | Slagel .................... C08G 18/12 528/60 |
| 2007/0024973 A1 | 2/2007 | Baiocchi et al. |
| 2008/0180803 A1* | 7/2008 | Seybert ............. C09D 201/005 359/642 |
| 2012/0172519 A1 | 7/2012 | Dörr et al. |
| 2014/0232978 A1* | 8/2014 | Park ........................ G02C 9/00 351/47 |
| 2017/0139230 A1* | 5/2017 | Ambler .................. G02C 7/022 |

FOREIGN PATENT DOCUMENTS

| | | |
|---|---|---|
| JP | H1130715 A | 7/1997 |
| KR | 10-2015-0119415 | 10/2015 |

OTHER PUBLICATIONS

JPH063504, Tomoji et al., Tokyo Keikaku KK., 1994; English translation. (Year: 1994).*
WIPO, U.S. International Search Authority, International Search Report and Written Opinion dated Aug. 3, 2017 in International Patent Application No. PCT/US2017/032261, 8 pages.
European Patent Office, Supplementary European Search Report dated Jan. 13, 2020 in European Patent Application No. 17796886, 6pp.
Korean Intellectual Property Office, Examination Report dated Aug. 3, 2020, in Korean Patent Application No. 10-2018-7035812, 7 pages.

* cited by examiner

Fig. 9

| Sample | (2) Wafer extract speed (mm/s) | (3) Coating thickness, (μm) | (4) Front mold, base curve | (5) Distance, wafer to front lens (mm) | (6) Adhesion by razor blade (ease of separation) | (7) Adhesion by Missile: Area Separated (mm²) | (8) Separation Between Wafer and Resin When Edging. |
|---|---|---|---|---|---|---|---|
| Example Lens 1 | 3 | 0.25 | 6 | 0.8 | No Separation | 0 | No |
| Example Lens 2 | 10 | 0.32 | 4 | 1.3 | No Separation | 5 | No |
| Example Lens 3 | 2 | 0.2 | 0 | 1.0 | Not Tested | 3 | No |
| Example Lens 4 | 5 | 0.4 | 0 | 1.0 | Not Tested | 6 | No |
| Example Lens 5 | 1 | 2.5 | 4 | 0.9 | Not Tested | 8 | No |
| Example Lens 6 | 1 | 0.15 | 4 | 1.1 | Not Tested | 250 | No |
| Example Lens 7 | 1 | 0.15 | 4 | 1.1 | Not Tested | 142 | No |
| Comparative Lens 8 | NA | NA | 6 | 1.1 | Full Wafer Separation from Lens | 512 | Yes |

Fig. 10

| Samples | Wafer Treatment | Max tensile strength (Mpa) | Percent Elongation at Break |
|---|---|---|---|
| Example Lens 1 | aliphatic polycarbonate polyurethane dispersion | 21 | 400 |
| Example Lens 2 | polyester polyurethane dispersion | 41 | 440 |
| Example Lens 3 | aliphatic polycarbonate polyurethane dispersion | 21 | 400 |
| Example Lens 4 | aliphatic polycarbonate polyurethane dispersion | 21 | 400 |
| Example Lens 5 | polysiloxane | 3 | 20 |
| Example Lens 6 | aliphatic polycarbonate polyurethane dispersion | 13 | 188 |
| Example Lens 7 | acrylic emulsion | <5 | 80 |
| Comparative Lens 8 | none | NA | NA |

CAST LENS

RELATED APPLICATIONS

This application claims benefit of and priority to U.S. Provisional Application Ser. No. 62/336,368 filed May 13, 2016, entitled Cast Lens, which is hereby incorporated herein by reference in its entirety.

FIELD OF THE INVENTION

The present invention is directed to cast polyurea-urethane ophthalmic lenses and, more particularly, to cast ophthalmic lenses incorporating a functional insert and treatments that improve adhesion of the cast lens material with the functional insert.

BACKGROUND OF THE INVENTION

Recently, polyurea-urethane resins have been employed as a base material for the formation of ophthalmic lenses as an alternative to polycarbonate materials due to the combination of improved optical quality, high impact resistance and higher thermal resistance. One example of such a material used for ophthalmic lenses has been marketed under the trade name Trivex® by PPG industries of Pittsburgh, Pa., as well as several alternative brand names by lens manufacturers, including NXT (Essilor), Phoenix (Hoya) and Trilogy (Younger Optics). Ophthalmic lenses are formed of this material through a casting and thermal curing process. Example methods for obtaining such lenses are disclosed in U.S. Pat. No. 6,127,505 and U.S. patent application No. 2003/0096935A1 which are hereby incorporated herein by reference.

A polyurea-urethane resin lens with a functional insert such as a photochromic or polarization layer can be produced with a method described in the Assignee's U.S. Pat. No. 7,858,001 which is incorporated herein by reference. When producing a cast ophthalmic lens using a functional insert, adhesion between the insert and resin can be problematic. Lens failure may occur due to separation of the functional insert and resin during lens processing such as surfacing and edging or during subsequent usage by a consumer. Hence, what is needed in the art is a robust cast ophthalmic lens incorporating a functional insert in which the adhesion between the functional insert or wafer and the lens resin is improved and methods of making the same.

OBJECTS AND SUMMARY OF THE INVENTION

The present invention provides a cast ophthalmic lens having improved adhesion between a functional insert or wafer and a bulk polymerized polyurea-urethane lens resin and methods of making the same. These objectives are achieved, in part, by providing an ophthalmic lens comprising an optically functional wafer; a layer of a polymerized polyurea-urethane lens resin; and a wafer treatment adhering the optically functional wafer to the layer of the polymerized polyurea-urethane lens resin. In certain embodiments of the present invention the optically functional wafer comprises a photochromic polyurethane layer; the optically functional wafer comprises an optically functional layer interposed between two transparent protective layers; the optically functional wafer comprises a polycarbonate protective layer; the polymerized polyurea-urethane lens resin comprises a composition formed of at least one isocyanate-containing component and at least one dual amine-hydroxyl functional containing component and a hydroxyl-containing component; the wafer treatment comprises a dip coating; the wafer treatment comprises an elongation up to 500 percent; the wafer treatment comprises an elastic modulus greater than 15 MPa; the wafer treatment comprises an aliphatic polycarbonate polyurethane dispersion; and the wafer treatment comprises a polysiloxane.

The above objectives are also achieved, in part, by providing an ophthalmic lens comprising: an optically functional wafer having a first side and a second side having an adhesion improving coating; a first layer of a polymerized polyurea-urethane lens resin adhered adjacent the adhesion improving coating on the first side of the optically functional wafer; and a second layer of a polymerized polyurea-urethane lens resin adhered adjacent the adhesion improving coating on the second side of the optically functional wafer. In certain embodiments of the present invention the optically functional wafer comprises a polarizing layer; the optically functional wafer comprises a polycarbonate protective layer; the adhesion improving coating comprises an aliphatic polycarbonate polyurethane dispersion; and the adhesion improving coating comprises a polysiloxane.

The above objectives are also achieved, in part, by providing a method of forming an ophthalmic lens comprising: obtaining an optically functional wafer; coating the optically functional wafer with an adhesion improving coating to form a coated optically functional wafer; positioning the coated optically functional wafer within a cavity of a lens mold assembly; introducing a polyurea-urethane lens resin into the cavity of the lens mold adjacent to the adhesion improving coating of the coated optically functional wafer; and polymerizing the polyurea-urethane lens resin within the cavity of the lens mold. In certain embodiments of the present invention obtaining an optically functional wafer comprises obtaining a optically functional wafer formed into a desired base curvature; positioning the coated optically functional wafer within a cavity of a lens mold assembly comprises positioning the coated optically functional wafer within a casting mold gasket; coating the optically functional wafer comprises coating the optically functional wafer with an aliphatic polycarbonate polyurethane dispersion; and introducing the polyurea-urethane lens resin into the cavity of the lens mold comprises introducing a layer of the polyurea-urethane lens resin adjacent to the adhesion improving coating on a first side and on a second side of the coated optically functional wafer.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which:

FIG. 9 is a table indicating manufacturing specifications for functional wafers and ophthalmic lenses and performance characteristics for functional wafers and ophthalmic lenses according to certain embodiments of the present invention.

FIG. 10 is a table indicating manufacturing specifications for functional wafers and ophthalmic lenses and performance characteristics for functional wafers and ophthalmic lenses according to certain embodiments of the present invention.

DESCRIPTION OF EMBODIMENTS

Figure 1:
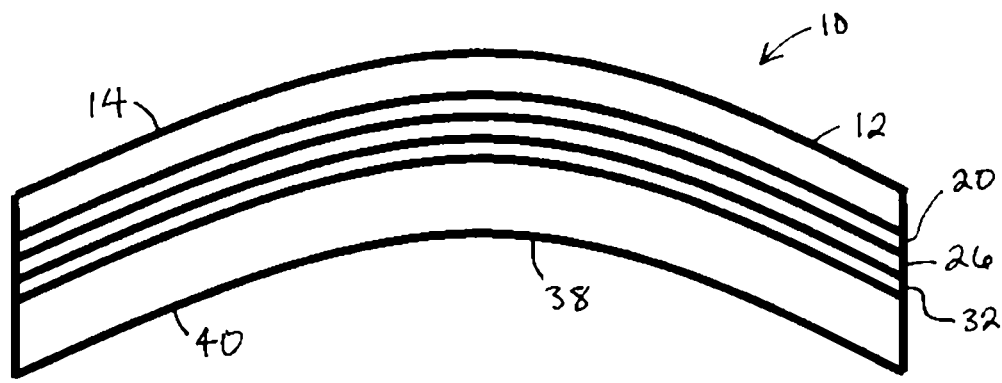
FIG. 1 is a cross-sectional view of an ophthalmic lens according to one embodiment of the present invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Generally speaking, the present invention provides an ophthalmic lens incorporating functional properties, for example photochromic and/or polarizing properties in which the interface between the bulk lens resin and the film layer or layers imparting the lens with functional properties has improved adhesion. This objective is achieved by casting a lens incorporating a functional wafer that imparts one or more functional properties to the finished lens. The functional wafer is embedded in the lens resin just beneath a front lens surface or is incorporated into a front, back, or front and back side of the lens. The functional wafer is formed of an ophthalmic-grade functional film or of an ophthalmic-grade functional film having an ophthalmic-grade protective film on one or both sides of the ophthalmic-grade functional film. The optically functional lenses produced according to the present invention have excellent adhesion between the lens resin material and the functional wafer. Such improved adhesion is achieved through a novel treatment of the outer or exterior optical surfaces of the functional wafer with, for example, a chemical treatment, a physical treatment, or a combination thereof that improves adhesion between the functional film wafer and the lens resin.

For the sake of clarity, the terms "lens resin", "bulk lens resin", and "cast lens resin" refers to the bulk, curable, resinous lens material employed to form an ophthalmic lens and that is primarily responsible for imparting one or more optical powers to the formed lens. The terms "wafer", "functional wafer", and "optically functional wafer" refer to the film structure that is incorporated into the formed lens and that is primarily responsible for imparting the desired optically functional property or characteristic to the formed lens. The terms "wafer", "functional wafer", and "optically functional wafer" are intended to refer to a film structure formed of either a single film layer or a film laminate structure formed of multiple film layers attached to one another. In the context of the present invention, a lens and a film laminate wafer are distinct structures. The term "adjacent" means immediately preceding or following.

Figure 2:
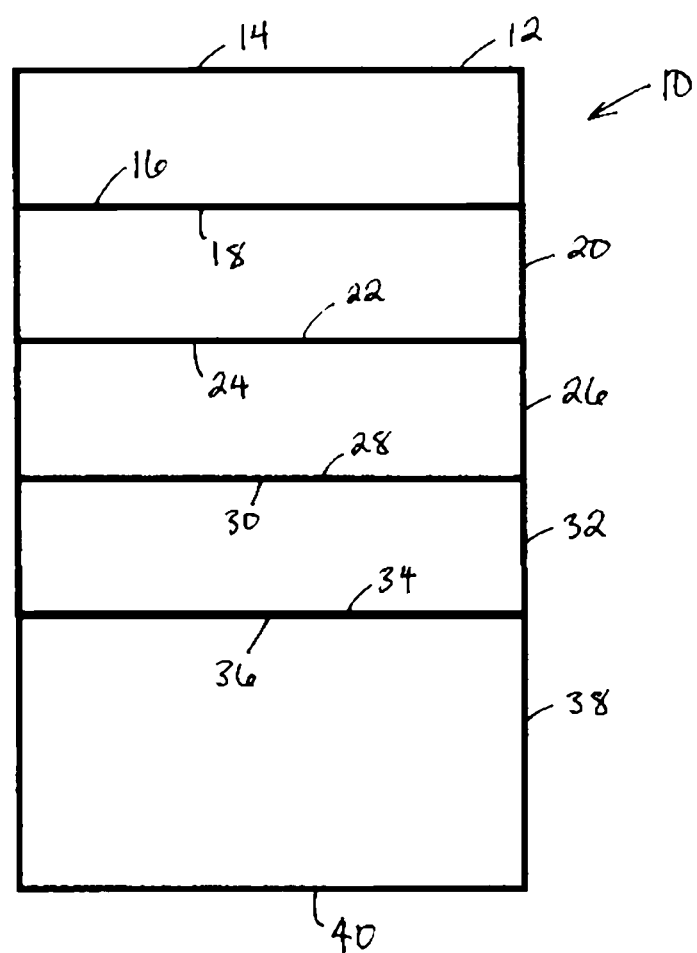
FIG. 2 is a partial cross-sectional view of an ophthalmic lens according to one embodiment of the present invention.

In certain embodiments of the present invention, as shown in FIGS. 1 and 2, a lens 10 employs a multilayer structure that incorporates a functional wafer between two layers of lens resin. A front resin layer 12 represents the polymerized form of the curable lens resin and forms a front side 14 of the lens 10. Adjacent a side 16 of the front resin layer 12 is a side 18 of a first wafer treatment 20. Adjacent a side 22 of the first wafer treatment 20 is a side 24 of a functional wafer 26. Adjacent a side 28 of functional wafer 26 is a side 30 of a second wafer treatment 32. Adjacent a side 34 of the second wafer treatment 32 is a side 36 of a back resin layer 38 which represents the polymerized form of the curable lens resin and also forms a back side 40 of lens 10. The first wafer treatment 20 and the second wafer treatment 32 function to provide improved adhesive between sides 24 and 28 of the functional wafer 26 and the side 16 of the front lens resin layer 12 and the side 36 of the back lens resin layer 38, respectively.

Figure 3:
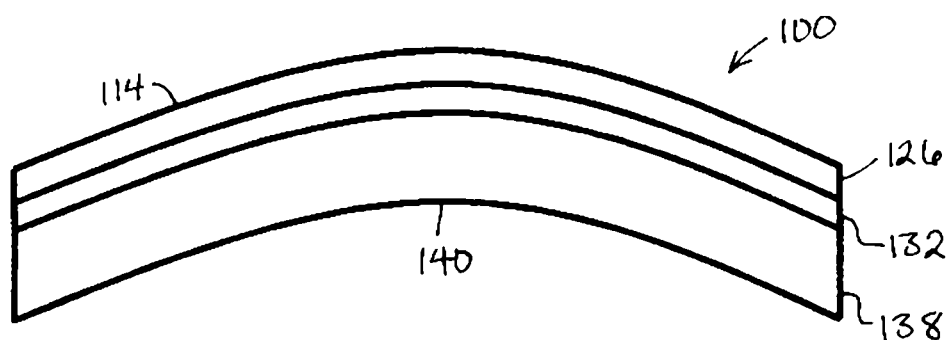
FIG. 3 is a cross-sectional view of an ophthalmic lens according to one embodiment of the present invention.
Figure 4:
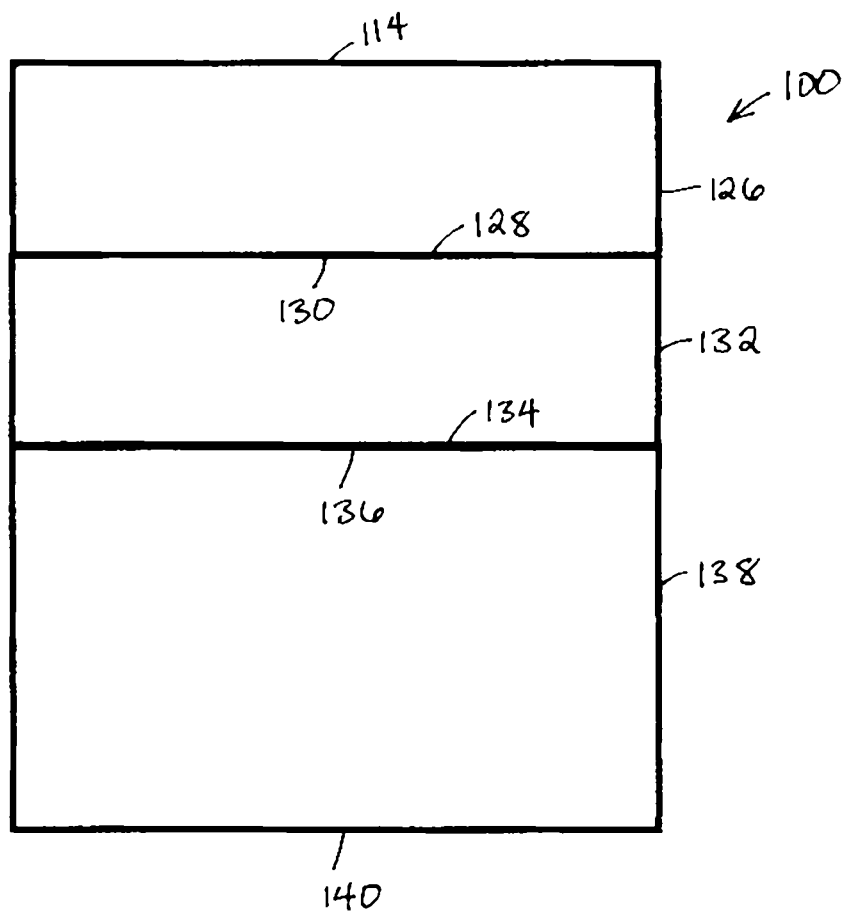
FIG. 4 is a partial cross-sectional view of an ophthalmic lens according to one embodiment of the present invention.

In certain embodiments of the present invention, as shown in FIGS. 3 and 4, a lens 100 employs a multilayer structure that incorporates a functional wafer that forms one side of the lens 100 and a lens resin that forms a second side of the lens 100. In this embodiment, a functional wafer 126 forms front side 114 of the lens 100. Adjacent a side 128 of functional wafer 126 is a side 130 of a wafer treatment 132. Adjacent a side 134 of the wafer treatment 132 is a side 136 of a back resin layer 138 which represents the polymerized form of the curable lens resin and also forms a back side 140 of lens 100. The wafer treatment 132 functions to provide improved adhesive between side 128 of the functional wafer 126 and the side 136 of the lens resin layer 138, respectively.

In certain embodiments, the functional wafer may alternatively form a back side of the lens or may form a front and back side of the lens in which case the lens resin is interposed between the two functional wafers.

Functional Wafer:

The functional wafer according to the present invention provides an optical function such as, for example, coloration, tinting, polarization, photochromism, electrochromism, UV absorption, blue light filtering, and narrow band filtering. The wafer starts from a flat film structure, is cut into shapes such as circular, strip or other shapes, and is then thermally formed to a desired base curve. In practice, the wafer may be cut from a flat film structure that, after thermal forming, results in a wafer having a desired size or the wafer may be cut from a flat film structure, thermally formed, and recut to the desired size. The flat film structure can be a single layer of film or a film laminate with a functional layer positioned next to a protective film layer or between two protective film layers.

Figure 5:
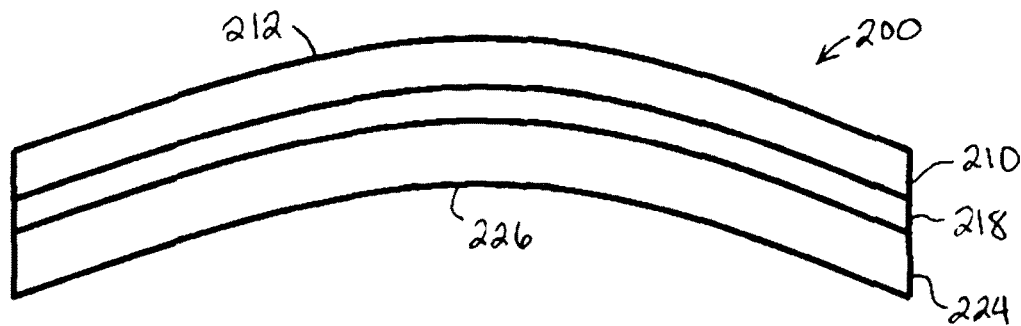
FIG. 5 is a cross-sectional view of a functional wafer according to one embodiment of the present invention.
Figure 6:
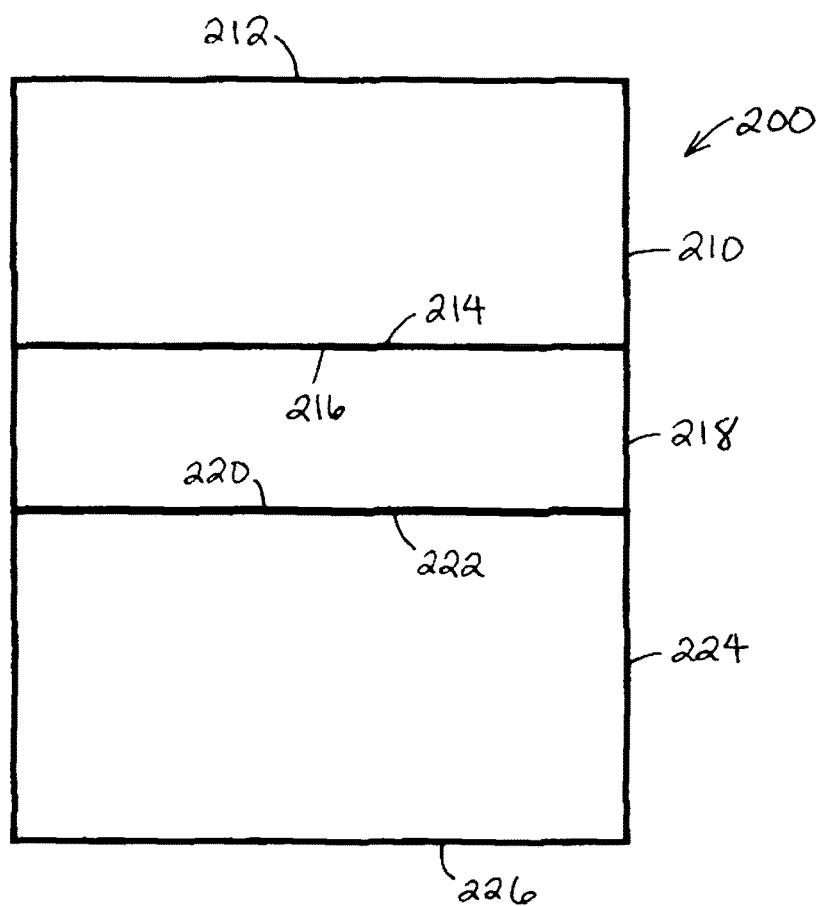
FIG. 6 is a partial cross-sectional view of a functional wafer according to one embodiment of the present invention.

In certain embodiments, as shown in FIGS. 5 and 6, a thermally formed functional wafer 200 employs a first transparent protective layer 210 that forms a front side 212 of the functional wafer 200. A side 214 of the first transparent protective layer 210 is adjacent a side 216 of a functional layer 218. A side 220 of the functional layer 218 is adjacent a side 222 of a second transparent protective layer 224 that also forms a back side 226 of the thermally formed wafer 200.

In certain embodiments of the present invention, the functional layer of the functional wafer has, for example, a thickness in the range of 10 to 100 micrometers. The protective layer(s) have, for example, a thickness in the range of 0.1 to 0.6 millimeters or in the range of 0.15 to 0.5 millimeters.

The functional film wafer and/or the protective layers of the film laminate wafer are formed of an ophthalmic-grade transparent resin film or sheet. Suitable transparent resin film or sheet materials include polycarbonate, polysulfone, cellulose acetate buturate (CAB), polyacrylate, polyester, polystyrene, copolymers of acrylate and styrene, and poly(vinyl alcohol) (PVA). Polycarbonate-based materials include, for example, polybisphenol-A carbonate; homopolycarbonate such as 1,1'-dihroxydiphenyl-phenylmethyl-methane, 1,1'-dihroxydiphenyl-diphenylmethane, 1,1'-dihydroxy-3,3'-dimethyl diphenyl-2,2-propane, their mutual copolymer polycarbonate and copolymer polycarbonate with bisphenol-A. Cellulose acylate-based materials include, for example, cellulose diacetate and cellulose triacetate.

Functional wafers having a film laminate structure formed of multiple film layers may employ layers having the same or different thicknesses. For example, in certain embodiments, the functional wafer employs a photochromic layer having a thickness of 40 micrometers. On a first side of the photochromic layer a polycarbonate film having a thickness of 0.3 millimeters is laminated and on a second side of the photochromic layer a polycarbonate film having a thickness of 0.4 millimeters is laminated. Functional wafers having a film laminate structure formed of multiple film layers may employ outer or protective layers that are formed of the same material or different materials and may be formed of retarding or non-retarding layers.

Exemplary optically functional wafers are described in the Assignee's U.S. Publication Nos., 2013/0004775, 2015/0098057, 2015/0219813, 2015/0226880, 2015/0309209, 2016/0011337, and 2016/0361906 which are hereby incorporated herein in their entireties.

Wafer Treatment:

The wafer treatment of the present invention forms an optically clear film which is free of defects and enables an ophthalmic quality, non-tacky surface. The wafer treatment layer has good adhesion to functional wafers and provides chemical and mechanical protection of the functional wafer allowing necessary wafer handling such as packaging, transportation and casting process. The treated wafer surface allows wetting by the casting resin composition.

In certain embodiments, the wafer treatment is a chemical treatment and is applied to each side of the wafer that will be adjacent to a layer of lens resin. For example, in the case of a lens incorporating a wafer between two layers of lens resin, the wafer treatment will be applied to both sides of the wafer. The wafer treatment preferably provides a non-tacky surface after application on the wafer. The wafer treatment is in a form that can be applied to the wafer surfaces by, but not limited to, conventional coating method such as dip coating, spin coating, spray coating and roll coating.

Exemplary wafer treatment materials include, but are not limited to, polyurethanes, polyacrylates, polysiloxanes, and epoxies. The treatment can be in a solvent solution or aqueous dispersion form. In certain embodiments, the treatment is a polyurethane dispersion. In certain other embodiments, the wafer treatment is an aliphatic polyurethane dispersion. In certain embodiments, the wafer treatment of the current invention is a polyurethane dispersion with an elastic modulus greater than 10 MPa and an elongation of greater than 100 percent. In certain embodiments, the wafer treatment for the current invention is a polyurethane dispersion with an elastic modulus greater than 15 MPa and an elongation of greater than 500 percent.

In certain embodiments, the wafer treatment formulation has a non-volatile content in the range of 0.5 to 30 percent, 1 to 10 percent, or 1 to 6 percent.

In certain embodiments, the wafer treatment formulation contains organic solvents to assist the wafer treatment process. Solvents used include, but not limited to, water, ethanol, isopropanol, ethyl acetate, ethyleneglycolmonomethylether, ethyleneglycolmonopropylether, ethyleneglycolmonobutylether, acetone, or mixtures thereof. In certain embodiments, it is advantageous to employ a mixture of solvents having different boiling temperatures and surface tensions in order to optimize the coating process. Solvent levels can range from 1 to 80 percent for each solvent employed.

In certain embodiments, flow modifiers are employed in the wafer treatment formulation. Examples of flow modifiers that can be employed are nonionic hydrocarbons such as Air Product Surfynol 440, Dynol 977E, silicone surfactants such as Silstab 2550, Byk-Chemie Byk 331, Byk-dynwet, Evonik TEGO Flow 300, Flow 370, and fluorinated surfactant such as Novec FC4430 or FC-4432.

In certain embodiments, crosslinking agents can also be employed as an additive in the wafer treatment formulation to improve adhesion of the wafer to the lens resin. Crosslinking agents can be, for example, emulsifiable isocyanates aliphatic or cycloaliphatic polyisocyanates. Examples of commercial emulsifiable polyisocyanate include Evonik VESTANAT T, VESTANAT HB. Crosslinking agents can, for example, be blocked isocyanate such as VESTANAT B. Crosslinking agents can, for example, also be hydrolysates of functional silane monomers or oligomers. Examples of functional silanes are, for example, 3-aminopropyltriethoxysilane, 3-aminopropyltrimethoxysilane, 2-aminoethyl-3-amino-propyltrimethoxysilane, 2-aminoethyl-3-amino-propylmethyltrimethoxysilane, 3-glicidyloxypropyltriethoxysilane, 3-glicydoxypropyltrimethoxysilane. Preferred crosslinking agents include 3-glicidyloxypropyltriethoxysilane and 3-glicydoxypropyltrimethoxysilane. The level of crosslinking agent employed can ranges from 0.1 to 4 weight percent of the solution.

Cast Lens Resin:

A suitable polyurea-urethane lens resin for ophthalmic applications can be produced from the polymerization of a mixture of (1) an isocyanate-containing component or components and (2) a dual amine/hydroxyl functional containing component or components and/or a hydroxyl-containing component or components.

(1) Isocyanate-Containing Component:

One form of isocyanate-containing component is an aliphatic diisocyanate. One isocyanate element is a cycloaliphatic diisocyanate. Examples of cycloaliphatic diisocyanates are 3-isocyanatomethyl-3,5,5-trimethylcyclohexylisocyanate which are more commonly known as isophorone diisocyanate, 2,5 (or 2,6)-diisocyanatomethylbicyclo[2.2.1]heptane or Norbornene diisocyanate, meta-tetramethylxylene diisocyanate (1,3-bis(1-isocyanato-1-methylethyl)-benzene). These are commercially available from Cytec Industries Incorporated under the tradename TMXDI, 4,4'-Methylenebis(cyclohexyl isocyanate), and are mixtures of trans,trans, trans,cis and cis,cis isomers, also known as H12MDI. A commercial grade of H12MDI of more than 20% of trans,trans isomer is available from Covestro under the name Desmodur W. One isomer mixture is 4,4'methylenebis(cyclohexyl isocyanate) with more than 20% of the trans,trans isomer.

Another form of isocyanate-containing component is a prepolymer obtained by reacting the previously mentioned aliphatic diisocyanate(s) with one or more polyols in a mixture ratio such that the molar ratio of isocyanate to hydroxy functionality is in the range of 1.5 to 4. Suitable polyols used for the application are polyether polyol, polyester polyol, polyurethane polyol, polycarbonate polyols and polybutadiene polyols, where polycaprolactone polyol and polycarbonate polyol are advantageous in certain embodiments. Suitable Polyols for the present application have molecular weights in the range of 100 to 3000 or a molecular weight of 400 to 1000. The prepolymer may be produced by reaction of the components at temperature from 30 to 130 degree Celsius for 3 to 24 hours such that more than 90 percent of the hydroxyl functionality is reacted and the prepolymer reaches a pre-calculated isocyanate level, normally from 3 to 13 percent. The reaction can be catalyzed by many different catalysts known in the art such as, but not limited to, stannous octoate, dibutyl tin dilaurate, dibutyl tin diacetate, dibutyl tin mercaptide, dibutyl tin dimaleate, dimethyl tin diacetate, dimethyl tin dilaurate, 1,4-diazabicyclo[2.2.2]octane, and mixtures thereof.

(2) Dual Amine/Hydroxyl Functional Containing Component or Components and/or a Hydroxyl-Containing Component or Components:

Dual amine/hydroxyl-containing components are compounds with both amino and hydroxyl functional groups in the same molecule. Examples of such compounds are 3-aminopropylpropanol, 3-[(3-aminopropyl)amino]-1-propanol, 3-[(2-aminopropyl)amino]-1-propanol, 2-(2-aminoethoxy) ethanol, a mixture of 3,5-diethyltoluene-2,4-diamine and 3,5-diethyltoluene-2,6-diamine available as Ethacure 100 supplied by Albermarle Corporation. Dual amine/hydroxyl-containing components may optionally be mixed with the hydroxyl-containing components referred to in this application One form of hydroxyl-containing component is a mixture of one or more polyols. The polyols may be the above-mentioned polyols. Certain polyols include polycaprolactone and polycarbonate polyol with molecular weights between 400 to 3000. The polyol mixture may also contain small molecule diols or triols such as 1,6-hexanediol, 1,4-butanediol, glycerol, trimethylolpropane or 1,4-cyclohexanedimethanol.

Additives such as UV absorbers, light stabilizers, antioxidant agents, blue dyes, and internal mold release agents can be mixed into either component 1 or 2 of the mixture. Without incurring limitation, examples of UV absorbers are benzotriazols such as Tinuvin 328, Cyasorb 5411. Without incurring limitation, examples of light stabilizers are hindered amine light stabilizer such as Tinuvin 144 and Tinuvin 765. Without incurring limitation, examples of antioxidants are phenolic antioxidants such as Irganox 245, Irganox 1010, Irganox PS 800 and Irganox B 225. Without incurring limitation, examples of internal mold release agents are alkyl phosphate such as MR-Inner release agent supplied by Mitsui Chemicals.

Components 1 and 2 described above are mixed such that the ratio of isocyanate to the sum of amino and hydroxyl functionality in the range of 0.9 to 1.1 or in a range of 1.0 to 1.04.

The polymerization reaction of polyurea-urethane resin is rapid, exothermic and the mixture increases in molecular weight and viscosity and reaches gelation within a few minutes. The mixing process therefore requires high-shear mixing equipment. An example of suitable high shear mixing equipment is a urethane processor provided by Max Process Equipment of Healdsburg, Calif.

Polymerization of the lens resin can be completed with a thermal curing process, normally in a temperature range of 100 to 140 degree Celsius, applied over a period of 4 to 24 hours. Higher curing temperatures reduce the required curing time.

Figure 7:
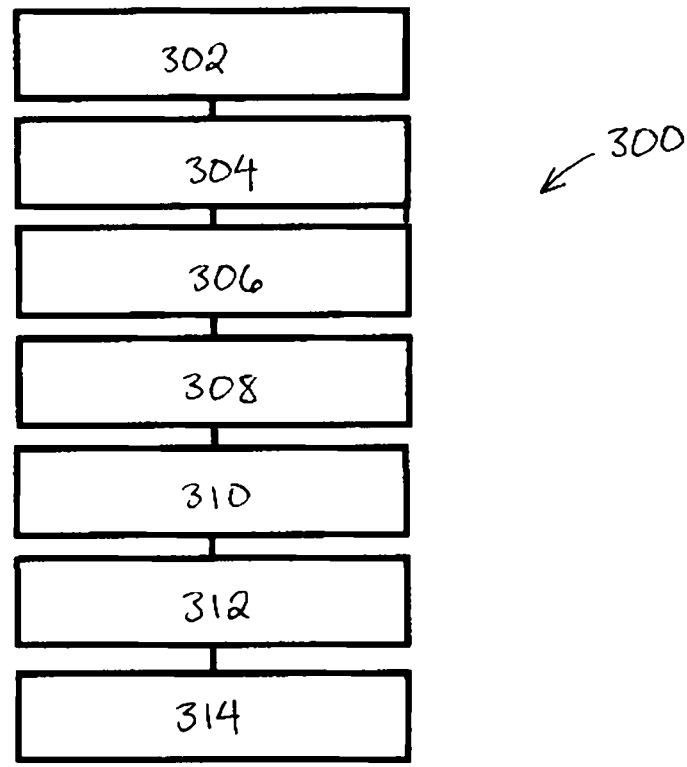
FIG. 7 is a diagram of a method of forming ophthalmic lenses according to one embodiment of the present invention.
Figure 8:
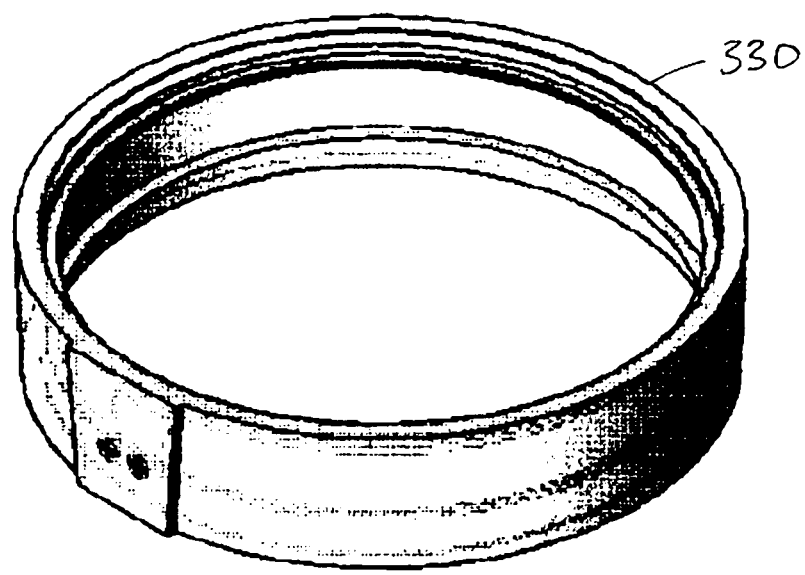
FIG. 8 is a perspective view of a cast lens mold gasket for formation of cast lenses.

Formation of Cast Lens:

In certain embodiments of the present invention, as shown in FIG. 7, the functional lens is form through a gasket casting process 300 in which a functional wafer is obtained (302). A front glass mold and a back glass mold are assembled to a gasket 330, shown in FIG. 8, so that the distance from the front and the back glass mold is the same as the desired lens thickness and a functional wafer is secured by the gasket so that the wafer is positioned between the front and the back glass mold (304). The front mold, back mold and gasket together form a cavity with the shape of the desired lens with the functional wafer inside the cavity. The lens resin is blended (306) and dispensed to fill the cavity (308). The lens resin is then polymerized and solidified to form a shape of an optical lens with the wafer embedded therein (310). Thermal curing follows to complete the polymerization of the lens resin prepolymer (312) and may be conducted at a temperature of up to 140 degree Celsius. The gasket and glass molds are then removed from the resulting optical lens (314). It will be understood that the steps of the above method can be performed in an order different than that described above.

In certain embodiments of the present invention, the functional lens is form through a taping process in which a functional wafer is temporarily adhered or attached to a front glass mold or a back glass mold, the opposing glass mold is positioned a desired distance from the wafer and a ribbon of tape is adhered around a perimeter of the assembled components. The lens resin is blended and dispensed to fill the cavity formed between a back surface of the wafer and the front surface of the back glass mold. The lens resin is then polymerized and solidified to form a shape of an optical lens with the wafer embedded therein. Thermal curing follows to complete the polymerization of the lens resin prepolymer. The gasket and glass molds are then removed from the resulting optical lens.

EXAMPLES

Wafer Examples

W1: A photochromic gray wafer having a thickness of 0.6 millimeters was formed of a photochromic polyurethane layer having a thickness of 40 micrometers laminated between two layers of polycarbonate film. The wafer was cut in to a circular shape having a diameter of 80 millimeters and was thermally formed to a base curvature of 6. Two arcs of 8 millimeters in width were removed from opposite sides of the wafer to form a strip-shape wafer.

W2: A gray polarizing wafer having a thickness of 0.7 millimeters was formed of a PVA polarizing layer having a thickness of 25 micrometers laminated with an optical adhesive between a non-retardation polycarbonate layer having a thickness of 0.3 millimeters and a retardation polycarbonate layer having a thickness of 0.4 millimeters. The wafer was cut into a hexagonal shape and was thermally formed to a base curvature of 4. The retardation polycarbonate layer was positioned on the convex surface of the wafer.

W3: A photochromic gray wafer having a thickness of 0.4 millimeters was formed of a photochromic polyurethane layer having a thickness of 40 micrometers laminated between two layers of polycarbonate film. The wafer was cut into a circular shape having a diameter of 76 millimeters and was thermally formed to a base curvature of 4. Two arcs of 2 millimeters in width were removed from opposite sides of the wafer to form a strip-shaped wafer.

W4: A PVA-based polarizing wafer having a thickness of 35 micrometers was formed, cut into a circular shape having a diameter of 80 millimeters and was thermally formed to a base curvature of 4. Two notches of 2 millimeters in depth were cut from opposite sides of the wafer.

W5: A grey polarizing wafer having a thickness of 0.6 millimeters was formed of a PVA polarizing layer having a thickness of 25 micrometers laminated with optical adhesive between two layers of retardation polycarbonate having thicknesses of 0.3 millimeters. The wafer was cut into a hexagon shape having a width of 75 millimeters and was thermally formed to a base curvature of 4.

W6: A grey polarizing wafer having a thickness of 0.6 millimeters was formed of a PVA polarizing layer having a thickness of 25 micrometers laminated with an optical adhesive between two layers of retardation polycarbonate having thicknesses of 0.3 millimeters and cut in to a round shape having a diameter of 44 millimeters. Two arcs of 3 millimeters in width were removed from opposite sides of the wafer to form a strip-shaped wafer.

Lens Example 1

1.1. 24 grams of an aliphatic polycarbonate polyurethane dispersion (PUD) supplied by Stahl under the trade name PU400 was diluted with 140 grams of ethanol and 35.2 grams of water to form a coating solution.

1.2. The photochromic wafer W1 described above was dipped into the coating solution described in section 1.1 and extracted at a speed specified in column 2 of FIG. 9 to form a wafer treatment layer. After drying the wafer in an oven at 70 degree Celsius for 30 minutes, the thickness of the adhesive was measured by Filmetrics reflectance spectroscope and is reported in column 3 of FIG. 9. Properties of the treatment are listed in FIG. 10.

1.3. A thermoplastic elastomer based gasket, a front glass mold with a base curve as specified in column 4 of FIG. 8 and a 5-base back glass mold were assembled with the above PUD coated wafer. The whole assembly formed a cavity with the shape of an optical lens in which the PUD coated wafer was inside the cavity and held at a distance of 0.8 millimeters from the front mold by a holding mechanism of the gasket.

1.4. A polyurethane-polyurea marketed under the trade name Trivex G3 by PPG Industries was blended and used to fill the front and back cavities of the assembly described above in 1.3. The whole assembly was thermally cured at about 130 degree Celsius to complete polymerization.

1.5. After removal of the gasket and glass molds, the lens formed had a 6-base front curvature and a center thickness of 9 millimeters. The lens was inspected for signs of haziness. The lens functional performance was measured using a Hunter spectrometer. The wafer distance to lens front surface was measured and is reported in column 5 of FIG. 9.

1.6. The lens resin and the wafer formed a solid block. A razor blade was used to attempt separation of the wafer from the resin to evaluate adhesion. Adhesion results are reported in column 6 of FIG. 9.

1.7. The back surface of the lens was ground down to a center thickness of 2 millimeters. Adhesion between the wafer and the resin was evaluated by a Missile test comprising a 4-pound steel mass with a cylindrical shape and round head. The steel mass was dropped onto the center of the lens from a height of 1 meter. Inspection for lens breakage and sign of delamination between the wafer and the resin was carried out and the results are reported in column 7 of FIG. 9.

Lens Example 2

2.1. 24 grams of an aliphatic polyester polyurethane dispersion (PPUD) supplied by Union Specialties Inc. under the brand name Unithane F27 was diluted with 140 grams of ethanol and 35.2 grams of water to form a coating solution.

2.2. The polarizing wafer W2 described above was dipped into the coating solution described in section 2.1 above and extracted at a speed specified in column 2 of FIG. 9 to form a wafer treatment layer. After drying the wafer in an oven at 70 degree Celsius for 30 minutes, the coating thickness was measured by Filmetrics reflectance spectroscope and is reported in column 3 of FIG. 9. Properties of the adhesion treatment layer are listed in FIGS. 9 and 10.

Steps 1.3 to 1.7 described above were repeated.

Lens Example 3

3.1 Wafer W6 described above was dipped into the coating solution described in step 1.1 of Lens Example 1, 1.1 and extracted at a speed specified in column 2 of FIG. 9 to form a wafer treatment layer. The wafer was dried in an oven at 70 degree Celsius for 30 minutes, the coating thickness was then measured by Filmetrics reflectance spectroscope and is reported in column 3 of FIG. 9.

3.2. The wafer obtained from step 3.1 was held at a gap of 1 millimeter from a round container mold.

3.3. 4.5 equivalent of 400 MW polycaprolactone, 0.6 equivalent of 750 MW polycaprolactone, 3.4 equivalent of trimethylolpropane, 1.7 equivalent of polypropylene glycol MW 2000 was mixed with 4.5 equivalent of dicyclohexylmethane-4,4'-diisocyanate, sold under the tradename Desmodur W by Bayer Material Science LLC, and 0.01 weight percent dibutyltindichloride in a reactor flask at 80 degree Celsius until isocyanate content reached 10.2 percent in 4 hours.

3.4. Ethacure 100, a curative or chain extender marketed by Ablemarle, was mixed into the mixture from step 3.3 such that a ratio of isocyanate to amine was 0.96 using a shear blade mixer. The mixture was used to fill the mold from step 3.2 and the mold was sealed. The assembly was then placed in an oven at 100 degree Celsius for 24 hours. The cured resin was then removed from the mold to obtain a flat polarized lens.

Lens Example 4

4.1. Wafer W6 described above was dipped into the coating solution described in step 1.1 of Lens Example 1 1.1 and extracted at a speed specified in column 2 of FIG. 9 to form a wafer treatment layer. The wafer was dried in an oven at 70 degree Celsius for 30 minutes, the coating thickness was then measured by Filmetrics reflectance spectroscope and is reported in column 3 of FIG. 9.

4.2. The wafer obtained from step 4.1 was held at a gap of 1 millimeters from a round container mold.

4.3 A 1.0 equivalent weight of polycaprolactone polyol MW 1000 supplied by Perstorp as CAPA2101A, 0.02 equivalents of dimethylolpropane was mixed well with 2 equivalents of Desmodur W at 50 degree Celsius. 1.02 equivalents of diethyltoluenediamine was quickly mixed into the mixture with a high shear mixer. The mixture was used to fill the mold from step 4.2 and the mold was sealed. The assembly was then placed in oven at 100 degree Celsius for 24 hours. The cured resin was then removed from the mold to obtain a polarized lens.

Lens Example 5

5.1. 227 grams of 70 percent hydrolyzed aminopropyltriethoxysilane, 301 grams of 70 percent hydrolyzed glycidoxypropyltrimethoxysilane, 60.8 grams of an organic epoxy, a diglycidyl ether of cyclohexane dimethanol, commercially available under the name Heloxy 107 by Hexion and 747 grams of methyl ethyl ketone (MEK), and 200 grams of butanol were mixed to form a coating solution.

5.2. The polarized wafer W2 described above was dipped into the coating solution described in section 5.1 above and extracted at a speed specified in column 2 of FIG. 9 to form an adhesion treatment layer. After drying off the solvents by placing the wafer in an oven at 100 degree Celsius for 30 minutes, the coating thickness was measured by Filmetrics reflectance spectroscope and is reported in column 3 of FIG. 9. Properties of the adhesion treatment layer are listed in FIGS. 9 and 10.

Steps 1.3 to 1.7 described above were repeated.

Lens Example 6

An aliphatic polycarbonate polyurethane dispersion solution supplied by Stahl Polymer as PU-461 was diluted to 4 percent solids and used as a coating solution. The photochromic wafer W4 described above was dipped into the solution and extracted at a speed specified in column 2 of FIG. 9. Steps 1.3 to 1.7 described above were repeated.

Lens Example 7

A waterborne acrylic emulsion marketed under the trade name AC-126 supplied by Stahl Polymers was diluted to 10 percent solid and used as a coating solution. The photochromic wafer W4 described above was dipped into the solution and extracted at a speed specified in column 2 of FIG. 9. Steps 1.3 to 1.7 described above were repeated.

Comparative Lens Example 8

The photochromic wafer W1 described above without a wafer treatment was used to produce a lens. Steps 1.3 to 1.7 described above were repeated. Separation between wafer and resin occurred during edging of the resulting lens.

FIGS. 9 and 10 are a table showing certain manufacturing specifications for the above-described example functional wafers and ophthalmic lenses and certain performance characteristics of the example functional wafers and ophthalmic lenses according to certain embodiments of the present invention.

In certain embodiments, the present invention provides a functional polyurea-urethane cast ophthalmic lens with a functional wafer that has excellent adhesion to the lens resin.

In certain embodiments, the present invention provides a functional polyurea-urethane cast ophthalmic lens with a functional wafer that has an adhesive treatment on the wafer surface.

In certain embodiments, the present invention provides a functional polyurea-urethane cast ophthalmic lens with a functional wafer that has a polyurethane dispersion coating adhesive treatment on the wafer surface.

In certain embodiments, the present invention provides a functional polyurea-urethane cast ophthalmic lens with a functional wafer that has a polyurethane dispersion coating adhesive treatment on the wafer surface.

In certain embodiments, the present invention provides a functional polyurea-urethane cast ophthalmic lens with a functional wafer that has a polycarbonate film as a protective layer.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. An ophthalmic lens comprising:
   an optically functional wafer;
   a base material layer of a polymerized polyurea-urethane lens resin; and
   a wafer treatment comprising an aliphatic polycarbonate polyurethane dispersion or a polysiloxane adhering the optically functional wafer to the base material layer of the polymerized polyurea-urethane lens resin;
   wherein a composition of said polymerized polyurea-urethane lens resin comprises a mixture of:
      an aliphatic diisocyanate component,
      a dual amine/hydroxyl functional containing component, and/or
      a hydroxyl-containing component.

2. The ophthalmic lens of claim 1, wherein the optically functional wafer comprises a photochromic polyurethane layer.

3. The ophthalmic lens of claim 1, wherein the optically functional wafer comprises an optically functional layer interposed between two transparent protective layers.

4. The ophthalmic lens of claim 1, wherein the optically functional wafer comprises a polycarbonate protective layer.

5. The ophthalmic lens of claim 1, wherein the wafer treatment comprises a dip coating.

6. The ophthalmic lens of claim 1, wherein the wafer treatment comprises an elongation of up to 500 percent.

7. The ophthalmic lens of claim 1, wherein the wafer treatment comprises an elastic modulus greater than 15 MPa.

8. The ophthalmic lens of claim 1, wherein said aliphatic diisocyanate is a cyclo-aliphatic diisocyanate.

9. The ophthalmic lens of claim 1, wherein a mixing ratio of said aliphatic diisocyanate to a sum of amino and hydroxyl functionalities is in a range of 0.9 to 1.1.

10. An ophthalmic lens comprising:
    an optically functional wafer having a first side and a second side having an adhesion improving coating;
    a first base material layer of a polymerized polyurea-urethane lens resin adhered adjacent the adhesion improving coating on the first side of the optically functional wafer; and
    a second base material layer of a polymerized polyurea-urethane lens resin adhered adjacent the adhesion improving coating on the second side of the optically functional wafer.

11. The ophthalmic lens of claim 10, wherein the optically functional wafer comprises a polarizing layer.

12. The ophthalmic lens of claim 10, wherein the optically functional wafer comprises a polycarbonate protective layer.

13. The ophthalmic lens of claim 10, wherein the adhesion improving coating comprises an aliphatic polycarbonate polyurethane dispersion.

14. The ophthalmic lens of claim 10, wherein the adhesion improving coating comprises a polysiloxane.

* * * * *